United States Patent [19]

Hunger

[11] Patent Number: 4,928,987
[45] Date of Patent: May 29, 1990

[54] FIFTH WHEEL COUPLING

[76] Inventor: Walter Hunger, Otto-Nagler-Strasse 13, 87 Wuerzburg, Fed. Rep. of Germany

[21] Appl. No.: 309,132

[22] Filed: Feb. 13, 1989

[51] Int. Cl.$^5$ ............... B62D 53/08; B62D 53/12
[52] U.S. Cl. ........................ 280/435; 280/433; 280/434; 384/421; 384/594
[58] Field of Search ............ 280/433, 434, 435, 436, 280/437, 271; 384/590, 591, 592, 593, 594, 596, 599, 600, 218, 570, 581, 421; 403/111, 325, 327

[56] References Cited

U.S. PATENT DOCUMENTS 3,352,571 11/1967 Nelson ........................... 280/435
3,539,202 11/1970 Nelson ........................... 280/434

FOREIGN PATENT DOCUMENTS 58-97572 6/1983 Japan .

Primary Examiner—Charles A. Marmor
Assistant Examiner—Wook Yoon
Attorney, Agent, or Firm—Foley & Lardner, Schwartz, Jeffery, Schwaab, Mack, Blumenthal & Evans

[57] ABSTRACT

A fifth wheel coupling for connection of a semitrailer to a tractor unit is disclosed in which a pair of symmetrical, swivel-articulated closing jaws having semicircular recesses for grasping the king pin have a split bearing comprising an outer bearing half fixed in each closing jaw and inner bearing halves rotatable with respect to the outer bearing halves. The split bearing includes a mechanism for returning each inner bearing half to a position aligned with its respective outer bearing half for uncoupling. The split bearing eliminates friction between the king pin and the closing jaws and is substantially free from wear and maintenance.

11 Claims, 5 Drawing Sheets

FIFTH WHEEL COUPLING

BACKGROUND OF THE INVENTION

The present invention relates to a fifth wheel coupling for the connection of a semitrailer to a tractor unit.

U.S. Pat. No. 3,352,571 discloses a fifth wheel coupling in which the king pin of the semitrailer is held by a kinematic locking mechanism of the tractor unit. The closing elements of the mechanism are two symmetrical, swivel-articulated closing jaws. In each of these jaws a semicircular recess is formed for seizing the king pin. The jaws can be swivelled back and forth between an opened position, releasing the king pin, and a locking position, seizing the king pin. One advantage of this design is the large contact area between the closing jaws and the king pin, so that only small surface pressures result and the wear is correspondingly small.

The large contact area between closing jaws and king pin has the character of a bearing of the king pin. The semicircular recesses of the closing jaws, joined together in the closed position of the closing jaws form a bearing shell; however, they must retain a certain play with respect to the king pin, because they must interact with a large number of different king pins. In addition, dirt can easily get onto the surfaces sliding against each other, in particular during coupling, which can then lead to a certain amount of wear.

SUMMARY OF THE INVENTION

If is therefore an object of the present invention to provide an improved fifth wheel coupling in which the surfaces sliding against each other during swivelling of the semitrailer with respect to the tractor unit can be matched without any play and are protected against the penetration of dirt. As a result, driving conditions are improved and wear resistance is increased so that the coupling is maintenance-free.

These and other objects according to the invention are achieved by a fifth wheel coupling for the connection of a semitrailer to a tractor unit, comprising a pair of symmetrical, swivel-articulated closing jaws having semicircular recesses for grasping a king pin of the semitrailer, a split bearing in the closing jaws comprising an outer half bearing fixed in each closing jaw and inner half bearings rotatable with respect to the outer half bearings, and means for returning each inner half bearing to a position aligned with its respective outer half bearing.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
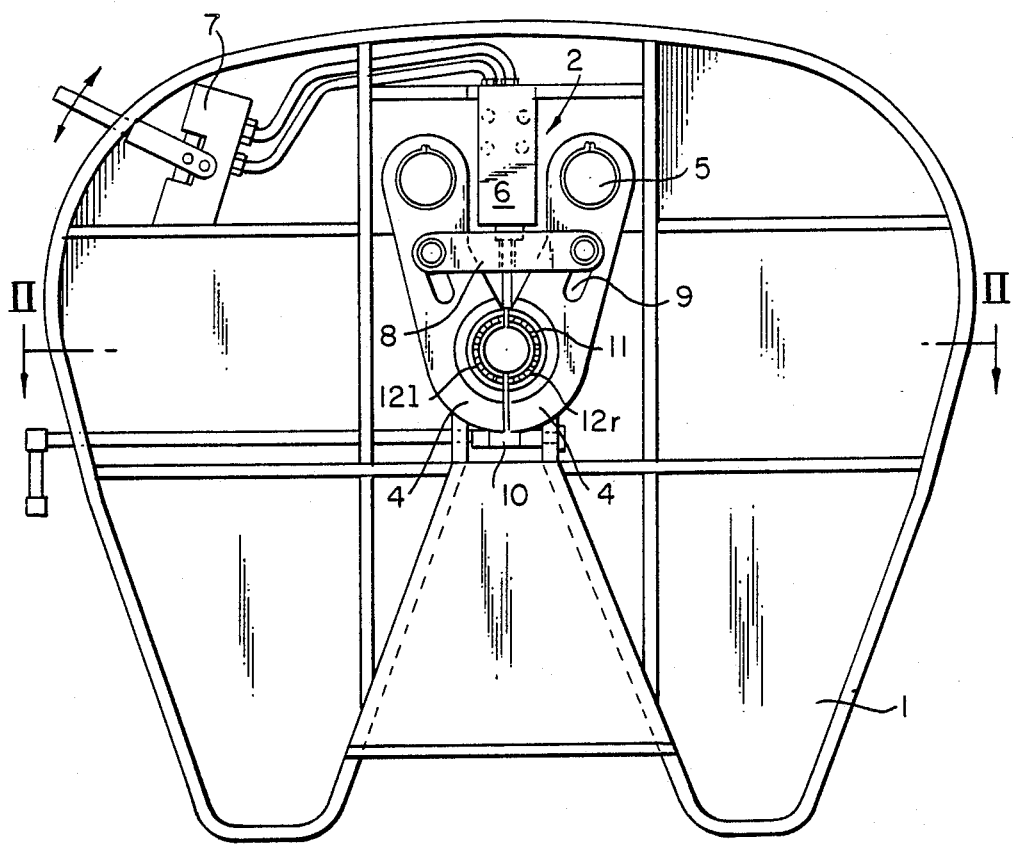
FIG. 1 shows a view from below the coupling plate with the kinematic locking mechanism for the king pin.
Figure 2:
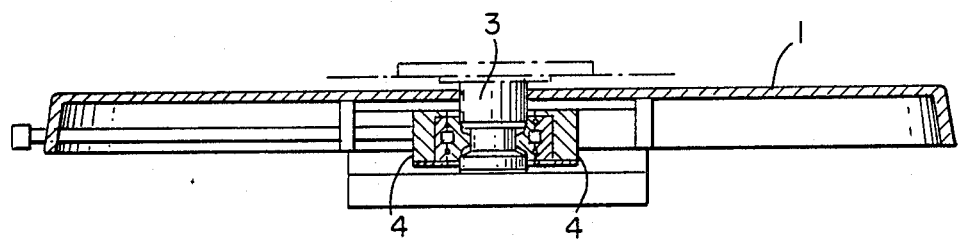
FIG. 2 is a section along II—II of FIG. 1.

FIG. 1 shows the underside of coupling plate 1 with kinematic locking mechanism 2 for king pin 3 (FIG. 2) of the semitrailer. This kinematic locking mechanism consists essentially of two closing jaws 4 arranged symmetrically with respect to the longitudinal plane and held by means of joint bolts 5 in a swivelling manner on coupling plate 1, and hydraulic cylinder 6 actuating the jaws. Hand pump 7 acts on hydraulic cylinder 6. When its piston rod moves out, transverse rod 8, fastened on the piston rod, is displaced to the rear (toward the trailer). Sliding blocks are fastened on the ends of transverse rod 8 and slide in guide grooves 9 of closing jaws 4, causing them to swivel apart when rod 8 is displaced to the rear. Manually-actuated mechanical locking clamp 10 ensures the closed position of closing jaws 4.

A semicircular recess is formed in the rear end of each rearwardly-pointing closing jaw 4. In the closed position of the closing jaws, the semicircular recesses complement each other to form a circular cylindrical space. In this space, split bearing 12 having two bearing halves 12 *r* and 12 *l* is accommodated.

Figure 3:
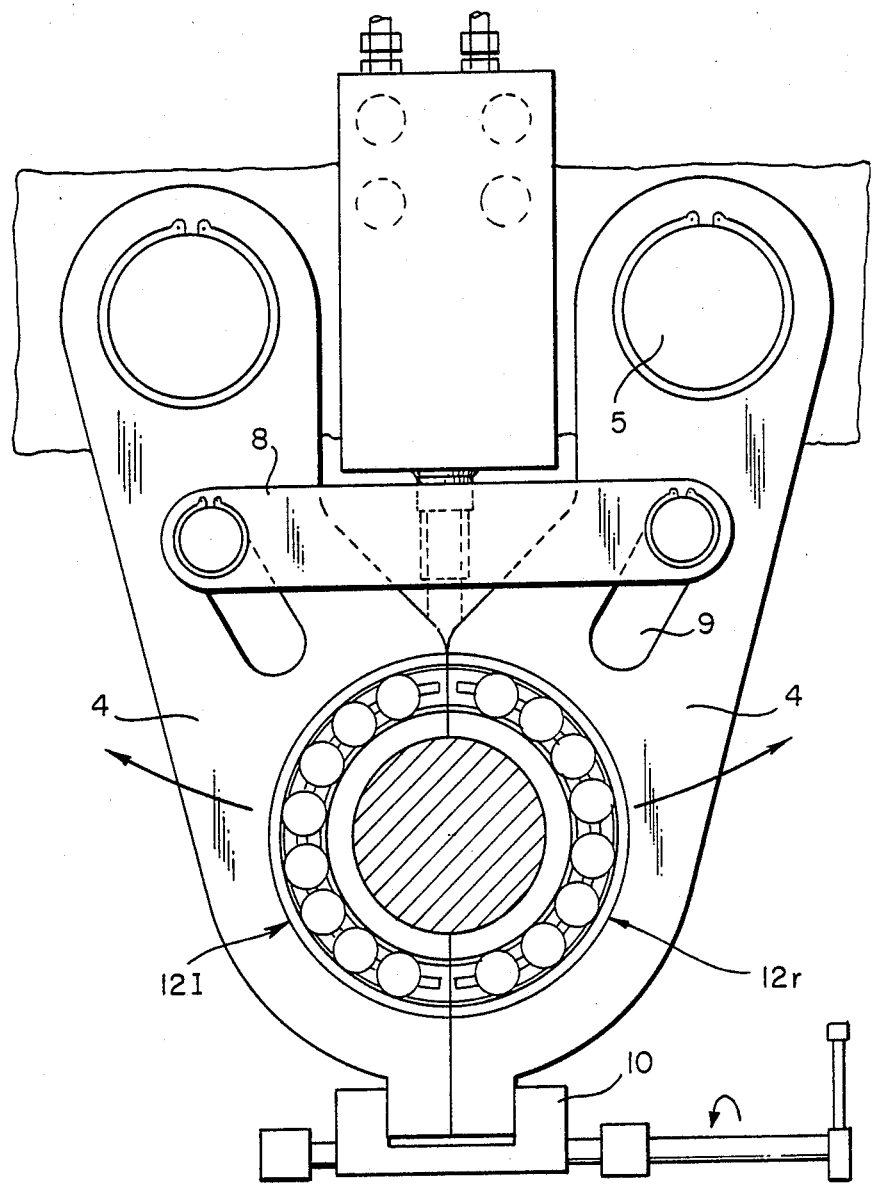
FIG. 3 shows the kinematic locking mechanism enlarged and in the closed position.
Figure 4:
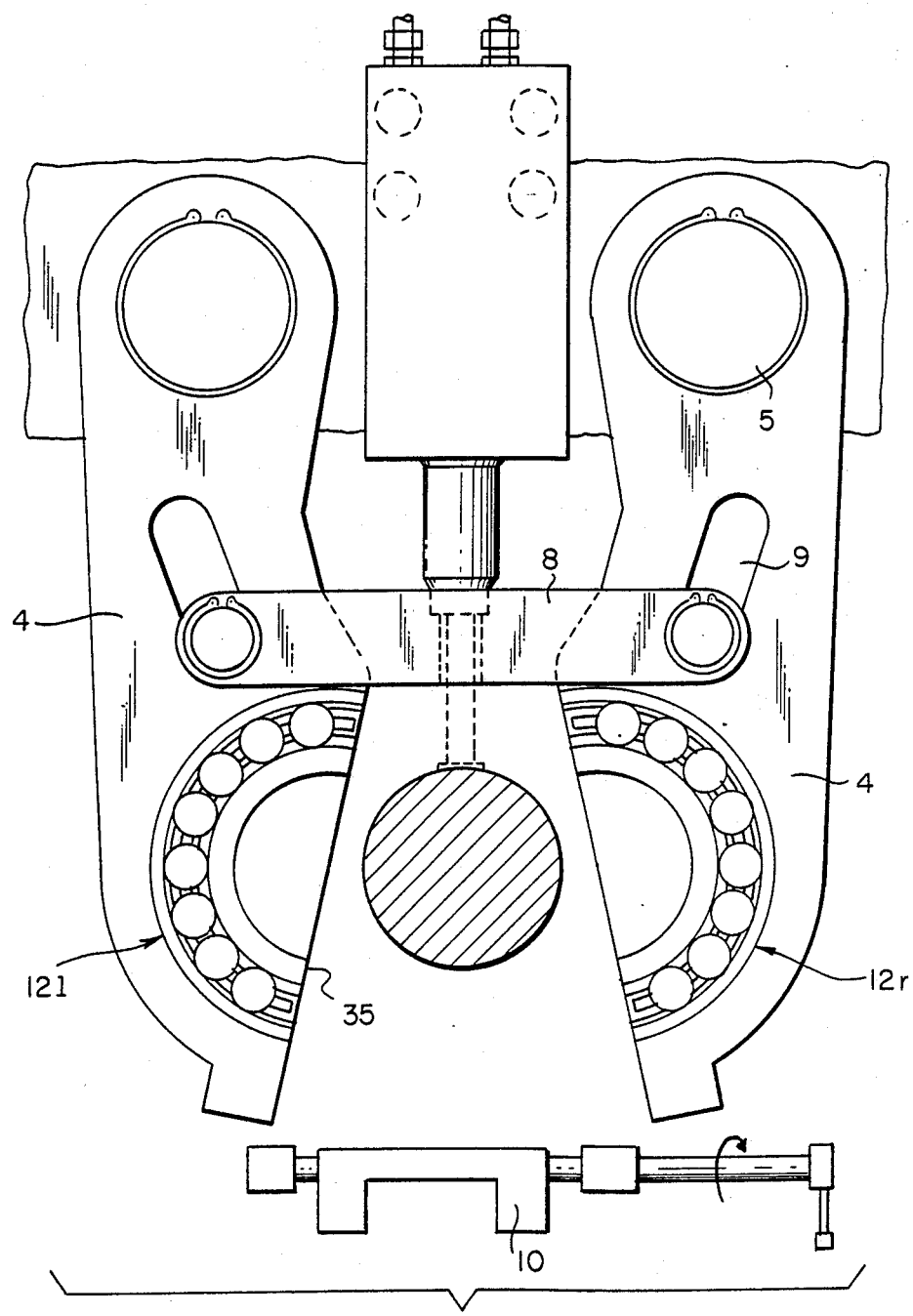
FIG. 4 shows the kinematic locking mechanism enlarged and in the opened position.

FIG. 3 shows the closing jaws in the closed position and secured by locking clamp 10. FIG. 4 shows the opened position. In both cases, the inner ring halves of the rolling bearing are in their aligned rotational position in which their interfaces 35 align flush with the abutting faces of closing jaws 4, which lie in the parting plane in the closed position of closing jaws 4.

Figure 5:
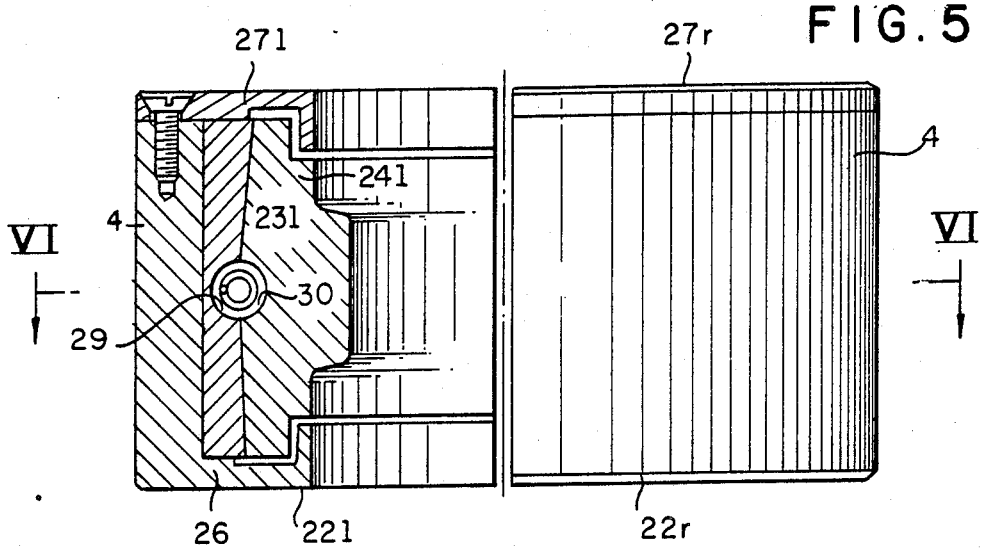
FIG. 5 is a longitudinal section through a sliding bearing built into the closing jaws.
Figure 6:
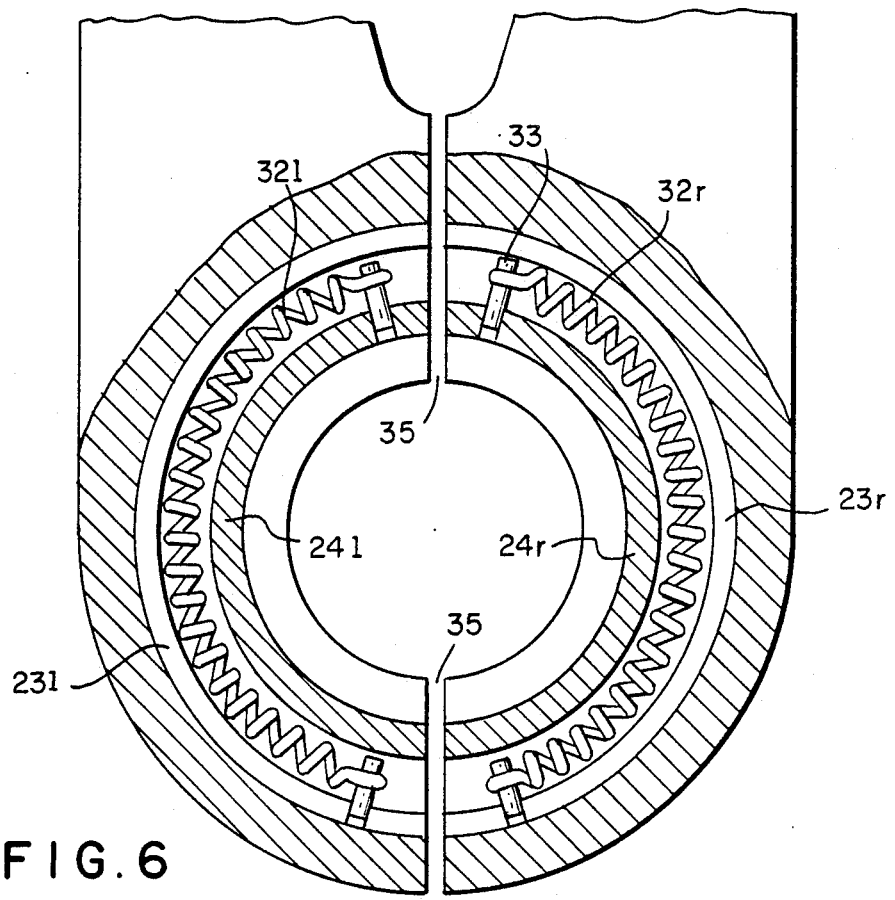
FIG. 6 is a cross-section according to line VI—VI of FIG. 5.

In the simplest case, split bearing 12 according to FIGS. 5 and 6 is a sliding bearing 22 with outer shell 23 and inner shell 24. Each bearing half 22 *l* and 22 *r* consists of outer shell halves 23 *l* and 23 *r* and inner shell halves 24 *l* and 24 *r* which lie completely within the associated outer shell halves and are enclosed by them in the aligned rotational position of the same shown in FIG. 6.

Outer shell halves 23 *l* and 23 *r* are each fastened in their respective closing jaw 4. For example, each closing jaw 4 may have along the edge of its semicircular recess 11, on one of its surfaces, a radially inward extension 26. From the radially inner edge of radial extension 26 a projection protrudes inwardly in the axial direction, so that the radial extension has in longitudinal section the hook shape evident in FIG. 5. This engages behind the edge of the inner shell 24 *l*, 24 *r*. On the other surface of closing jaws 4, correspondingly-shaped annular cover halves 27 *l*, 27 *r* are screwed. These hold the other edge of the inner shell by their hook-like longitudinal sectional shape. In this way, the inner shell remains in position in spite of splitting into two halves in the diametrical plane. The hook-shaped extension can alternately comprise part of a housing surrounding each closing jaw and/or constitute a part of the outer shell that engages the edges of the inner shell.

In the central cross-sectional plane VI—VI, mutually-opposing peripheral recesses 29 and 30 are formed in the mutually-facing surfaces of the outer and inner shells. These complement each other to form a toroidal channel. Helical spring 22 is inserted into channel 29/30 of bearing halves 22 r. Each spring end is fastened by means of anchor pin 33. One spring end of each spring is fastened in an outer shell half (23 l or 23 r) and the other spring end is fastened in an inner shell half (24 l or 24 r) of the associated sliding bearing half (22 l or 22 r). In this arrangement, the fastening points close to mutually-opposing interfaces 35 of the bearing halves are the same, i.e., the neighboring ends of the different springs are in each case anchored either on the outer shell or on the inner shell, as shown in FIG. 6.

In the aligned rotational position of inner shell 24 in outer shell 23 as shown in FIG. 6, springs 32 are in their unstressed state. When there is a rotational movement of the inner shell with respect to the outer shell, one spring is in tension and the other is in compression. For example, if there is a rotational movement of the inner shell to the right (clockwise), spring 32 l is stretched and spring 32 r is compressed. The stress state occurring in the two springs has the tendency to turn inner shell halves 24 l, 24 r out of the deflected rotational position and back into the aligned position.

In order to ensure a satisfactory entry of the interface end of the inner shell halves into the outer shell half of the respective other bearing half during the rotational deflection movements of the inner shell, the respective bearing surfaces may be sloped, in the manner of a ramp, and/or rounded, over a short distance in the edge zone.

Figure 7:
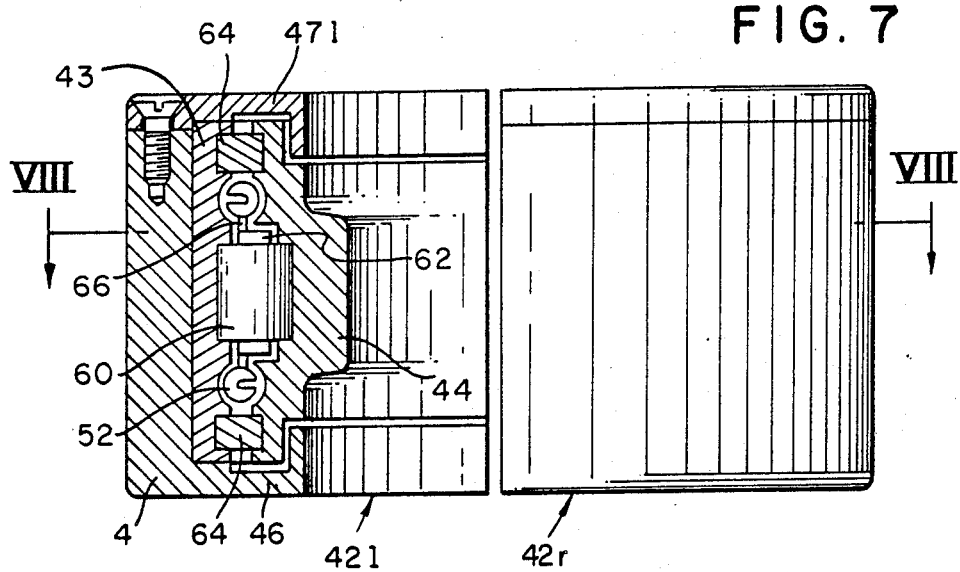
FIG. 7 is a longitudinal section through a rolling bearing built into the closing jaws.
Figure 8:
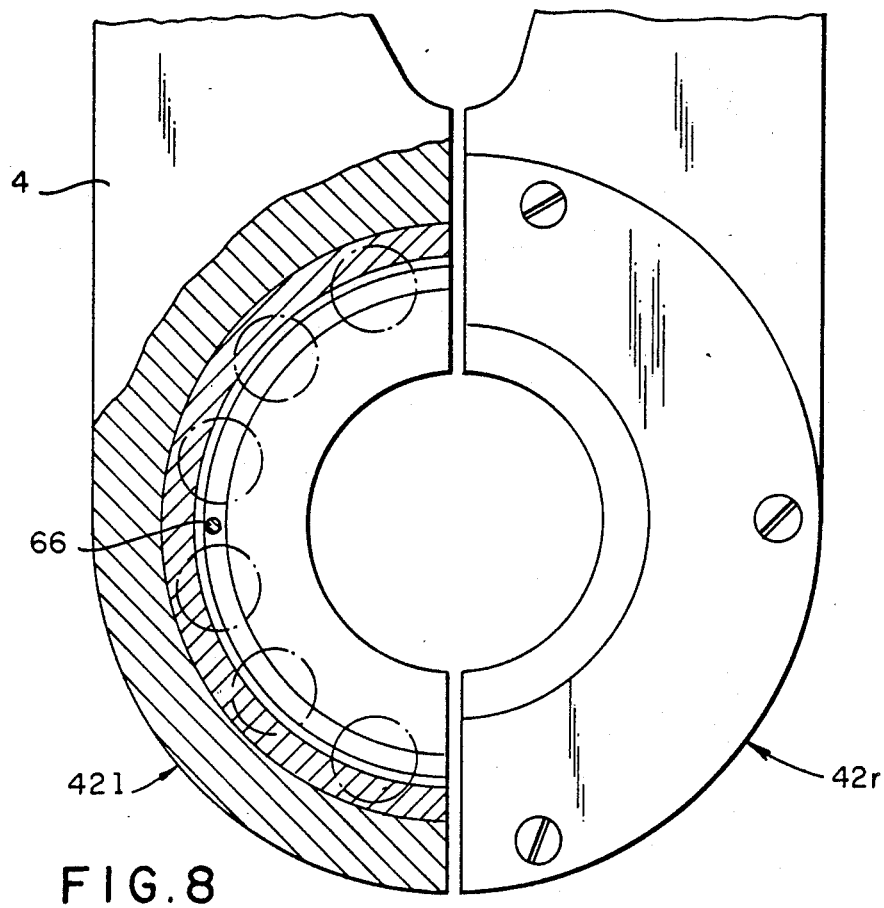
FIG. 8 is a cross-section according to line VIII—VIII of FIG. 7.

Split bearing 12 may, according to FIGS. 7 and 8, also be designed as a rolling bearing, for example as a roller bearing (also shown in FIGS. 3 and 4). In the case of this design as well, each bearing half 42 r, 42 l is inserted into recess 11 of its respective closing jaw, which is designed in longitudinal section similarly to the closing jaws according to FIGS. 5 and 6 and has hook-shaped radially inward projection 46 as well as screwed-on split annular cover 47 of corresponding longitudinal sectional shape.

This construction holds the halves of the actual roller bearing, which consists of outer ring 43, inner ring 44 (the inside surface of which is shaped for the seizing of king pin 3), and rollers 60 distributed between the two rings, which are held in cage 62. Outer ring 43, inner ring 44 and cage 62 are split into corresponding halves.

In the case of this design, helical return springs 52, similar to springs 32, are provided. Springs 52 are connected on two planes on both sides of rollers 60, so that two springs engage on each outer ring half and on each inner ring half.

The annular space between the bearing rings is terminated on both sides by split ring 64 of hardened steel in each case, which protrudes into mutually-opposing grooves of the inner ring and outer ring and is firmly seated in the groove of inner ring 44 and slides in the groove of the outer ring 43. Rings 64 absorb any axial stresses which may occur on the bearing inner ring 44.

While springs 52 are fastened by their ends on the outer ring halves and the inner ring halves in the same way as described with reference to the sliding bearing embodiment, in the case of the roller bearing design they are additionally connected by means of crosspiece 66 to their respective roller cage half 62 l, 62 r, i.e., at the midpoint of the spring in the sectional plane of FIG. 7. When there are deflections of the spring, this central point of the springs moves by about half the distance of the deflected spring end, which corresponds to the movement which roller cage 62 executes when there are deflections of inner ring 44. In this way, springs 52 have the tendency to return both inner ring halves 44 l, 44 r and cage halves 62 l, 62 r into their respective aligned position. As far as the cage halves are concerned, this is a precautionary measure, since in fact the cage would have to follow a return movement of the inner ring into the initial position, but this may be compromised by slipping occurring in operation.

The fifth wheel coupling described functions in the same way as the fifth wheel coupling of the prior art mentioned at the beginning. The difference is that no sliding friction takes place on the surface of king pin 3; instead this friction is either displaced into the interior of a substantially encapsulated sliding bearing or is replaced by the rolling of rolling bearing elements between an outer ring and an inner ring. In both cases, the connection between the king pin of the semitrailer and coupling plate of the tractor unit is particularly precise; it is low in friction, protected against dirt and substantially free from wear and maintenance.

What is claimed is:

1. A fifth wheel coupling for the connection of a semitrailer to a tractor unit, comprising:
   a pair of symmetrical, swivel-articulated closing jaws, said jaws having a mating pair of semicircular recesses for grasping a king pin of the semitrailer;
   a split bearing positioned in said recesses of the closing jaws, said bearing comprising an outer bearing half fixed in each closing jaw and a pair of inner bearing halves rotatable with respect to the outer bearing halves; and
   means for returning each inner bearing half to an initial position aligned with its respective outer bearing half.

2. A fifth wheel coupling according to claim further comprising a hook-shaped radially inward extension for holding the inner bearing.

3. A fifth wheel coupling according to claim 1, wherein the returning means comprises a helical spring inserted between each of the inner and outer pairs of bearing halves, one end of each spring being attached to the outer bearing half and the other end of each spring being attached to the inner bearing half.

4. A fifth wheel coupling according to claim 3, wherein the spring is accommodated in a toroidal space formed in at least one of the inner or outer bearing halves.

5. A fifth wheel coupling according to claim 1, wherein the split bearing comprises a sliding bearing.

6. A fifth wheel coupling according to claim 5, wherein each outer half bearing is integral with its respective closing jaw.

7. A fifth wheel coupling according to claim
   wherein the split bearing comprises a rolling bearing having rolling elements in a rolling element cage, the rolling element cage being split in the same plane as the inner and outer bearing halves.

8. A fifth wheel coupling according to claim 7, wherein each half of the split bearing comprises two return springs, one on each side of the rolling elements.

9. A fifth wheel coupling according to claim 7, wherein each spring is connected at approximately its midpoint to the rolling element cage.

10. A fifth wheel coupling according to claim 7, further comprising a split ring fitted in annular grooves in the inner and outer bearings at a position near the axial end faces of the bearing halves, said split ring being comprised of a hardened steel.

11. A fifth wheel coupling according to claim 2, wherein said radially inward extension comprises a portion of each closing jaw.

* * * * *